US010369940B2

(12) United States Patent
St-Cyr (10) Patent No.: US 10,369,940 B2
(45) Date of Patent: Aug. 6, 2019

(54) BRACKET FOR AND METHOD OF FORMING A WIRE HARNESS ASSEMBLY (71) Applicant: Bombardier Inc., Dorval (CA)

(72) Inventor: Martin St-Cyr, Mirabel (CA)

(73) Assignee: BOMBARDIER INC., Dorval (CA)

( * ) Notice: Subject to any disclaimer, the term of this patent is extended or adjusted under 35 U.S.C. 154(b) by 33 days.

(21) Appl. No.: 15/124,573

(22) PCT Filed: Mar. 10, 2015

(86) PCT No.: PCT/IB2015/051743
§ 371 (c)(1),
(2) Date: Sep. 8, 2016

(87) PCT Pub. No.: WO2015/136448
PCT Pub. Date: Sep. 17, 2015

(65) Prior Publication Data
US 2017/0080880 A1 Mar. 23, 2017

Related U.S. Application Data (60) Provisional application No. 61/950,411, filed on Mar. 10, 2014.

(51) Int. Cl.
H02G 3/00 (2006.01)
B60R 16/02 (2006.01)
H02G 3/32 (2006.01)

(52) U.S. Cl.
CPC ........... B60R 16/0215 (2013.01); H02G 3/32 (2013.01)

(58) Field of Classification Search
CPC . H01B 7/00; H01B 12/00; H01B 7/29; H01R 4/66; H01R 4/68; H01R 4/643;
(Continued)

(56) References Cited

U.S. PATENT DOCUMENTS 2,997,531 A * 8/1961 Oldham ................. F02P 7/025
174/158 R
3,825,874 A 7/1974 Peverill
(Continued)

FOREIGN PATENT DOCUMENTS

EP 2399824 12/2011
JP 2006296051 10/2006

OTHER PUBLICATIONS

Miyashita et al. (JP 2006-0296051 English Translation; hereinafter Miyashita).*
(Continued)

Primary Examiner — Pete T Lee
(74) Attorney, Agent, or Firm — Norton Rose Fulbright Canada LLP (57) ABSTRACT A bracket for forming a wire harness assembly prior to installation to a structure of a vehicle includes a conductive body adapted to attach the bracket to the vehicle, an interface portion adapted to attach at least one wire of a wire harness to the body, and at least one ground connector attached to the body. The interface portion is conductively insulated from the body. The at least one ground connector is adapted to electrically connect the wire harness to a ground. A method of forming a wire harness assembly for installation to a structure of a vehicle is also presented.

20 Claims, 7 Drawing Sheets (58) Field of Classification Search
CPC .......... H02B 5/01; H02G 15/34; H02G 15/20; H02G 5/00; H02G 5/10; H02G 7/08; H02G 3/26; H02G 3/0431; H02G 3/105; H02G 3/08; H02G 3/32; H01J 5/20; E04H 12/24; H05K 5/00; H05K 5/0026; H05K 5/0069; B60R 16/0239; B60R 16/0215; H01L 23/047

See application file for complete search history.

(56) References Cited

U.S. PATENT DOCUMENTS

| | | | | |
|---|---|---|---|---|
| 5,168,842 | A * | 12/1992 | Brooks | F02F 7/006 123/143 C |
| 5,723,819 | A | 3/1998 | Kirma et al. | |
| 6,106,341 | A * | 8/2000 | Leach | H01R 9/2491 439/796 |
| 6,373,721 | B2 * | 4/2002 | Lecinski | H02B 1/202 174/72 A |
| 7,056,161 | B2 * | 6/2006 | Delcourt | H01R 4/30 174/51 |
| 8,242,367 | B2 | 8/2012 | Guthke et al. | |
| 2003/0077927 | A1 * | 4/2003 | Momota | H01R 9/226 439/76.2 |
| 2009/0173844 | A1 * | 7/2009 | Huo | H02G 3/32 248/65 |
| 2010/0059246 | A1 * | 3/2010 | Wakileh | G02B 6/4477 174/78 |
| 2011/0068228 | A1 | 3/2011 | Ayme | |
| 2011/0079429 | A1 | 4/2011 | Ayme et al. | |
| 2013/0175087 | A1 * | 7/2013 | Adachi | H02G 3/0487 174/72 A |
| 2014/0014775 | A1 | 1/2014 | Luthi et al. | |

OTHER PUBLICATIONS

The State Intellectual Property Office of the People's Republic of China; Notification of First Office Action dated May 25, 2017 re: Application No. 201580013024.3.

The State Intellectual Property Office of the People's Republic of China, Notification of the Second Office Action dated Feb. 12, 2018 re: Application No. 201580013024.3.

China National Intellectual Property Administration; Third Office Action dated Sep. 10, 2018 re: Patent Application No. 201580013024.3.

* cited by examiner

BRACKET FOR AND METHOD OF FORMING A WIRE HARNESS ASSEMBLY

CROSS-REFERENCE TO RELATED APPLICATIONS

This application is a national phase application under 35 U.S.C. 371 of International Patent Application No. PCT/IB2015/051743 filed on Mar. 10, 2015, which claims priority from U.S. application No. 61/950,411 filed Mar. 10, 2014, the entire contents of which are incorporated by reference herein.

TECHNICAL FIELD

The application relates to forming and installation of wire harnesses and, more particularly, to a bracket for and a method of forming a wire harness assembly for installation to a structural component.

BACKGROUND OF THE ART

Installating wire harnesses might be a complex and time consuming task. Complexity of installation of such wire harnesses might be even more prevalent when installation occurs in a vehicle, such as, for example, an aircraft. Wire harnesses are among the largest parts in size aboard of a modern aircraft. Wire harnesses typically run through a length of the frame of the aircraft and connect different electrical components together. Wires are typically bundled together to form a wire bundle. A wire harness typically comprises one or more wire bundles. Alternatively, a wire harness is formed by a combination of one or more wire bundles with individual wires which are not part of a specific wire bundle. A wire harness might also comprise associated electrical and electro-mechanical components such as but not limited to, relays, relay bases, terminal modules, ground studs, grounds modules, clamps and electrical identifications.

A wire harness is attached to the frame of the vehicle via brackets. Each bracket acts as an interface to mechanically attach the wire harness to the structure of the vehicle. Each bracket is attached to the structure of the vehicle and comprises a portion, for example, a rack, which mechanically interfaces with the wire harness. The wire harnesses are attached to the rack via cable ties, such as, for example, tie-wraps. A cable tie attaches a specific wire bundle of the wire harness to the rack of the bracket. A cable tie can also attach an individual wire of the wire harness to the rack of the bracket.

SUMMARY

In one aspect, there is provided a bracket for forming a wire harness assembly prior to installation to a structure of a vehicle. The bracket comprises a conductive body adapted to attach the bracket to the vehicle. An interface portion is adapted to attach at least one wire of a wire harness to the body. The interface portion is conductively insulated from the body. At least one ground connector is attached to the body. The at least one ground connector is adapted to electrically connect the wire harness to a ground.

In another aspect, the at least one ground connector includes at least one ground stud.

In another aspect, the at least one ground stud includes a screw inserted in a stacking of washers, lock-washers and nuts.

In another aspect, the interface portion includes at least one rack having a plurality of apertures configured to received tie connector therein.

In another aspect, the interface portion includes at least one clamp.

In another aspect, the interface portion is made of nylon.

In another aspect, the body is integrally formed.

In another aspect, the body includes a surface treatment preventing oxidation but allowing electric conduction.

In another aspect, the bracket further comprises a module connection portion.

In another aspect, at least one module is attached to the module connection portion.

In another aspect, the at least one module includes at least one wire connectable to the at least one ground connector.

In another aspect, an intermediate bracket attaches the at least one module to the module connection portion.

In another aspect, a bracket support is attached to the body. The bracket support being adapted to attach the body to the vehicle.

In another aspect, the bracket support is removably attached to the body.

In yet another aspect, there is provided a method of forming a wire harness assembly for installation to a structure of a vehicle. The method comprises a) attaching at least one wire bundle to a bracket; and b) connecting at least one of a plurality of electric wires of the wire bundle to at least one ground connector of the bracket, wherein steps a) and b) are performed outside of the structure of the vehicle.

In another aspect, steps a) and b) result in obtaining a wire harness assembly for attachment to the structure of the vehicle.

In another aspect, the method further comprises once the wire harness assembly is formed, installing the wire harness assembly to the structure of the vehicle.

In another aspect, installing the wire harness assembly to the structure of the vehicle comprises attaching the wire harness assembly to the structure of the vehicle.

In another aspect, attaching the wire harness assembly to the structure of the vehicle comprises attaching the bracket to a corresponding bracket support connected to the structure of the vehicle.

In another aspect, attaching the harness assembly to the bracket support provides electric connection between the wire harness assembly and the structure of the vehicle.

In another aspect, the method further comprises connecting at least one terminal module to bracket when performing either one of steps a) and b).

DESCRIPTION OF THE DRAWINGS

Reference is now made to the accompanying figures in which.

DETAILED DESCRIPTION

The present invention will now be described in connection with one or more embodiments. The discussion of any one particular embodiment or associated feature is not intended to be limiting of the present invention. To the contrary, the discussion of particular embodiments and features is intended to illustrate the breadth and scope of the present invention. There are numerous variations and equivalents that will be made apparent from the discussion that follows. Those variations and equivalents are intended to be encompassed by the scope of the present invention as if described herein.

With respect to various features that are discussed in connection with specific embodiments, it is noted that the features are not intended to be exclusive of one another. To the contrary, as should be apparent to those skilled in the art, several of the features may be combinable in arrangements that differ from the specific embodiments described below. Those combinations are contemplated to fall within the scope of the present invention.

Figure 1:
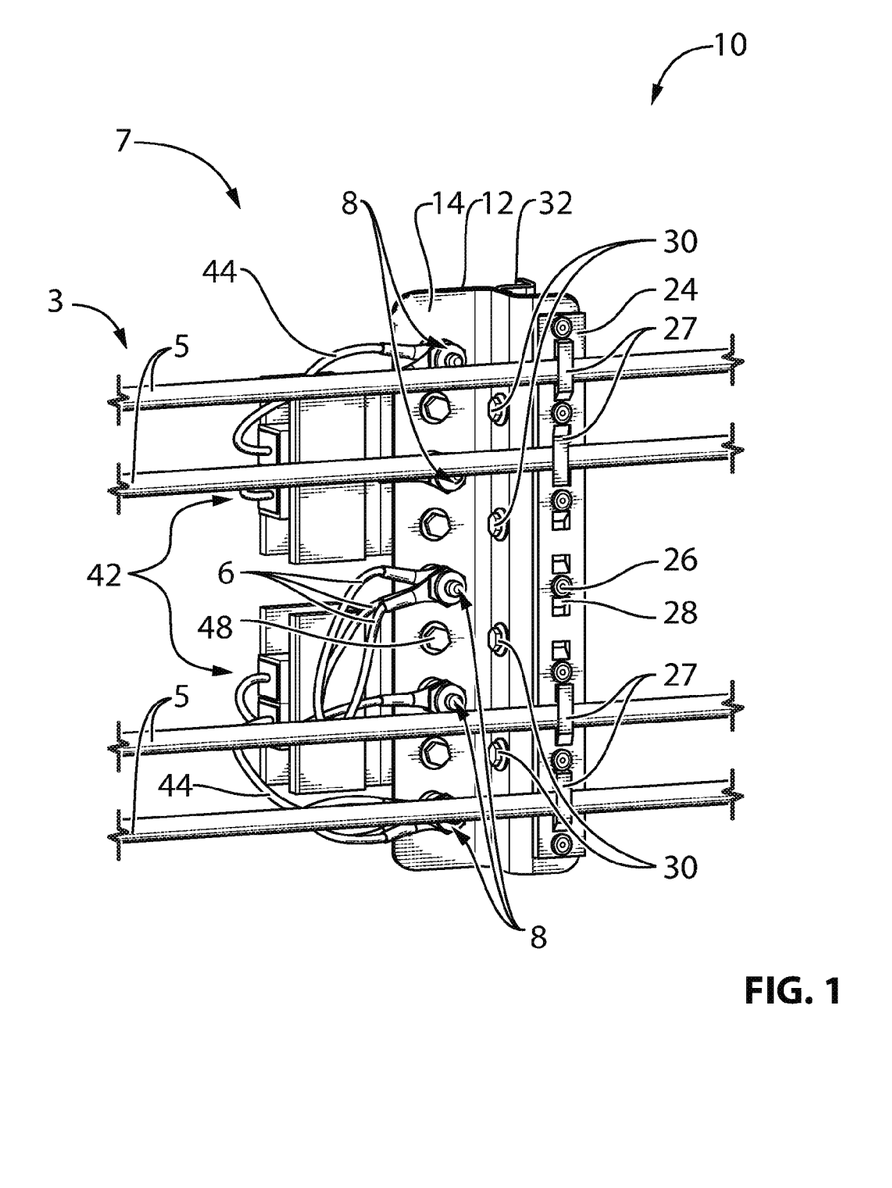
FIG. 1 is a perspective view of a first embodiment of a bracket to which four wire harnesses and two terminal modules are attached.
Figure 2:
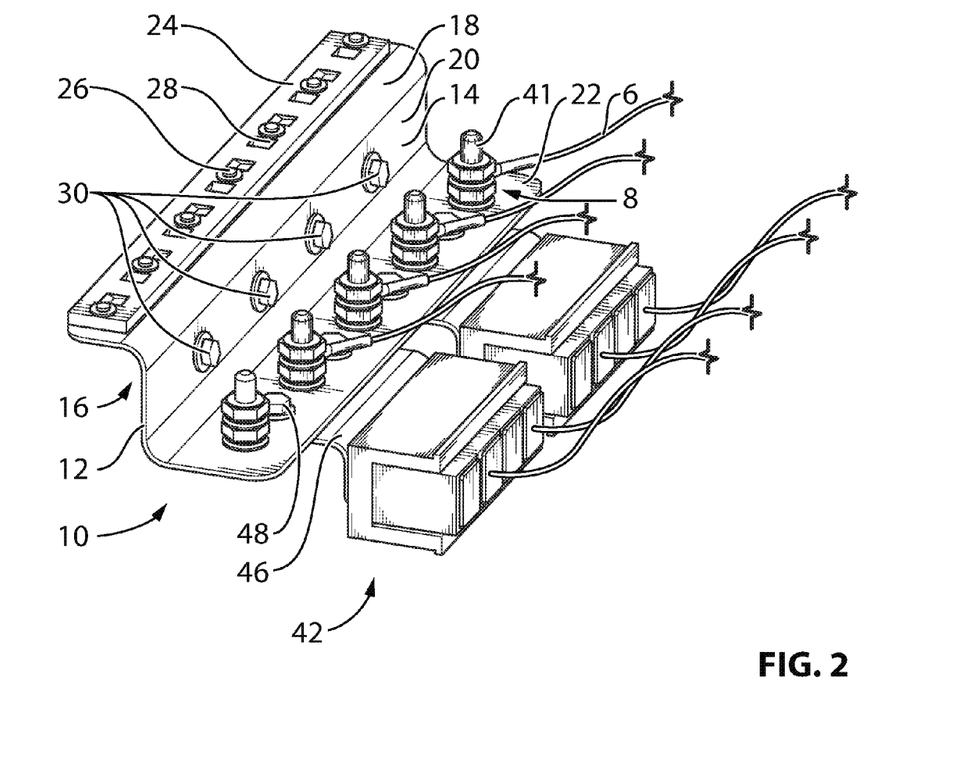
FIG. 2 is a perspective view of the bracket shown in FIG. 1.
Figure 3:
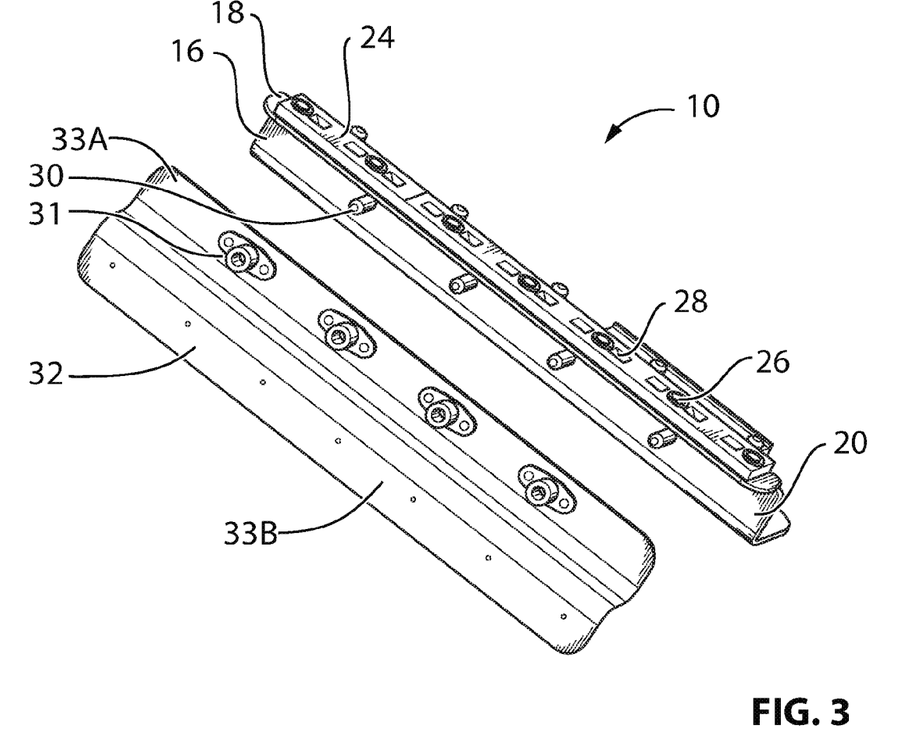
FIG. 3 is an exploded, perspective view of the bracket of FIG. 1.

Referring to FIGS. 1 to 3, a first embodiment of a bracket 10 is shown. In one of its functions, the bracket 10 attaches a wire harness 3. The wire harness 3 is made of a plurality of wire bundles 5. The wire bundles 5 each include a plurality of electric wires. The wire harness 3 may include wire bundles 5 and wires not in bundles. In addition to attaching the wire bundles 5, the bracket 10 allows connecting some or all of the wire bundles 5 to the ground via ground studs 8 integrated the bracket 10. As will be described below, the bracket 10 may have additional functions.

FIG. 1 shows a portion of the wire harness assembly 7, which in this embodiment comprises the bracket 10 and four wire bundles 5. The bracket 10 connects one or more electric wires 6 of the wire bundles 5 to the ground. The wire bundles 5 are shown schematically in FIG. 1, and it should be understood that the wire bundles 5 are a bundle of electric wires. It is contemplated however, that in some cases the wire bundle 5 may include a single electric wire. Although the bracket 10 shows attaching a wire harness 3 of four wire bundles 5, the bracket 10 may attach more or less than four wire bundles 5. The bracket 10 may connect more or less electric wires 6 to the ground depending on specifications of the wire harness assembly 7. The bracket 10 may be used in various environments where wire harnesses 3 are attached to each other to form a harness assembly. These environments include non-exclusively the aeronautics industry, the automobile industry, and the railroad industry. The bracket 10 may be used to form the wire harness assembly 7 before installing the wire harness assembly 7 to a structure of a vehicle. The receiving structure may be a variety of structures. For example, should the bracket 10 be used in the aeronautics industry, the receiving structure could be an inside member of an airplane frame.

Referring more specifically to FIGS. 2 and 3, the bracket 10 includes a body 12 having a first face 14 and a second face 16 opposite to the first face 14. The body 12 is metallic and conductive. In the particular embodiment shown in the Figures, the body 12 is made of aluminum. It is contemplated that the body 12 could be made of a metal other than aluminum. The body 12 may be made of any electrically conductive metallic alloy or any plastic or composite material with an electrical conductive plating or meshing. It is also contemplated that the body 12 could not be made entirely of metal and could instead have some metallic portions and some portions made of a non-conductive material. The body 12 is covered by a fine oxidised layer to protect it from corrosion. In some cases, the oxidised layer may be obtained by a chemical conversion coating (alodine) treatment. The oxidised layer may render the body 12 less conductive. As a consequence, some portions of the body 12 may be covered by a different corrosion resistant layer which may be more conductive. MIL-DTL-5541F, Military Specification, Chemical Conversion Coatings on Aluminum and Aluminum Alloys Type1 and Type2; class 1A may be used for general corrosion protection and Class 3 may provide protection against corrosion where low electrical resistance is required.

Figure 5:
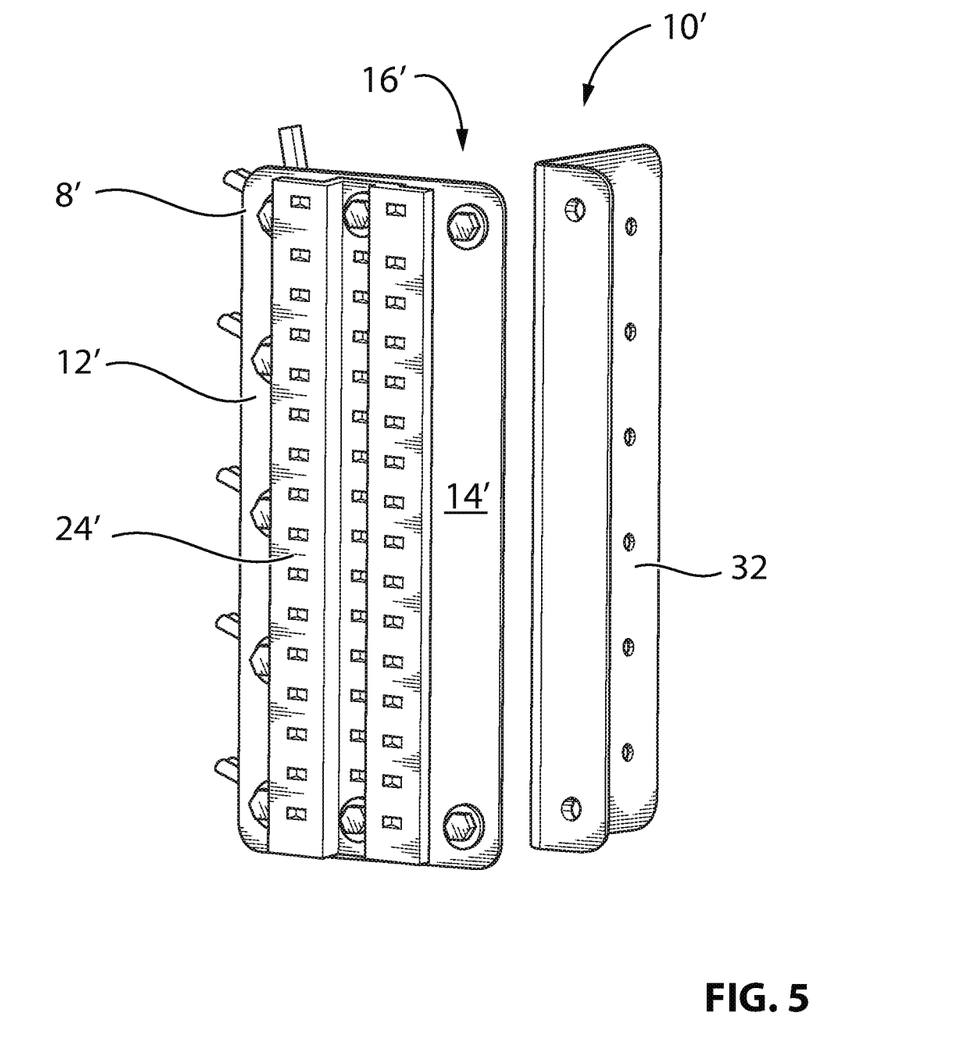
FIG. 5 is an exploded, perspective view of a second embodiment of a bracket.

The body 12 of the bracket 10 is integrally formed, but it is contemplated that the bracket 10 could be made of several bracket portions attached to each other. Although the body 12 is shown herein to have a straight elongated part, it is contemplated that the body 12 could be curved or form an angle. The body 12 may have various shapes depending on a configuration of the wire harness assembly 7 and/or on the structure the wire harness assembly 7 will be fixed to. In the particular embodiment shown in FIGS. 1 to 3, the bracket 10 has a Z-shaped body 12. A first body portion 18 is parallel to a third body portion 22. A second body portion 20 perpendicular to the first and third body portions 18, 22 attaches them together. It is contemplated that the body 12 could be flat, U-shape or any desirable shape. A second embodiment of the bracket 10' shown in FIG. 5 shows the bracket 10' with a flat body 12'.

Figure 6:
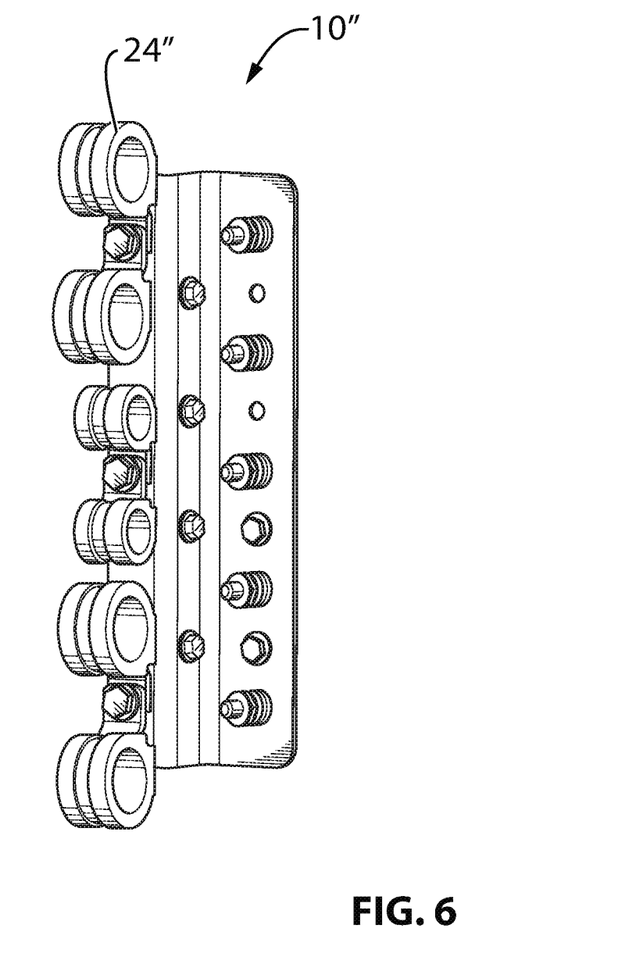
FIG. 6 is a perspective view of a third embodiment of a bracket for a wire harness.

The first body portion 18 includes an isolating rack 24 for receiving the wire bundles 5 thereonto. The rack 24 is made of nylon, but could be made of any suitable insulant. The rack 24 is attached to the first body portion 18 by a plurality of screws and washer assemblies 26. The rack 24 may be attached to the first body portion 18 by a plurality of rivets. The rack 24 includes a plurality of longitudinally spaced-apart apertures 28 sized to accommodate tie-wraps 27 (shown in FIG. 1) securing the wire bundles 5 onto the bracket 10. The tie-wraps 27 are designed to accommodate various shapes and sizes of wire bundles 5, and the plurality of apertures 28 facilitates choices of positioning of the wire bundles 5 with respect to each other. Although tie-wraps 27 are depicted in FIG. 1, it should be understood that other kinds of cable fasteners or cable ties, such as lacing cords, might be used without departing from the scope of the present invention. Although the particular embodiment of the bracket 10 shown in FIGS. 1 to 3 shows a single rack 24, it is contemplated that the bracket 10 could be designed to two or more racks 24 disposed at a same location or at various locations on the bracket 10. FIG. 5 shows the second embodiment of the bracket 10' with three racks 24'. It is understood that other securing structures could be used to attach the wire bundles 5 to the rack 24 of the bracket 10. In one example, shown in FIG. 6, a third embodiment 10" of the bracket otherwise similar to the bracket 10 includes a plurality of clamps 24" in place of the isolating rack 24. The clamps 24" are means of wires support. The clamps 24" may be made of various metallic alloy with an insulant material cushion or any plastic or composite material, and have various sizes to accommodate harnesses of different sizes.

The second portion 20 of the body 12 includes a plurality of screw and washer assemblies 30. The screws, which are best shown in FIG. 3, cooperate with nut plates 31 of a bracket support 32. The bracket support 32 acts as an interface between the structure of the vehicle and the bracket 10. The bracket support 32 has a first face 33a adapted to attach to the second face 16 of the second portion 20 of the bracket 10, and a second face 33b adapted to attach to the receiving structure. In one example, the second face 33b of the bracket support 32 is riveted to the receiving structure. The screw and washer assemblies 30 and the nut plates 31 form a releasable connection, which allows to attach all of the wire bundles 5 on one hand and to attach the bracket support 32 to the receiving structure on the other hand, before attaching the bracket 10 to the bracket support 32. It is contemplated that the bracket support 32 could be permanently attached to the bracket 10 and riveted to the structure only after the wire harness assembly 7 is formed. In one example, the bracket support 32 could be integrally formed with the bracket 10. The bracket support 32 is made of a same conductive material as the bracket 10. It is contemplated that the bracket support 32 could be made of any electrically conductive metallic alloy or any plastic or composite material with an electrical conductive plating or meshing. The screw and washer assemblies 30 may be covered of a cadmium layer to protect them from galvanic corrosion. The second face 16 of the second portion 20 and the first and second faces 33a,b of the bracket support 32 may be covered by a conductive yet protective oxidation layer per MIL-DTL-5541F, Chemical Conversion Coatings on Aluminum and Aluminum Alloys Type1 and Type2; Class 3 or equivalent. The first face 33a of the bracket support 32 and the second face 16 of the second portion 20 are chemically converted per MIL-DTL-5541F class 3 or equivalent to facilitate the electrical connection between the bracket 10 and the bracket support 32. The second face 33b of the bracket support 32 is chemically converted per MIL-DTL-5541F class 3 or equivalent to facilitate electric connection between the bracket support 32 and the receiving structure since the bracket 10 is also a ground connection bracket. It is contemplated that the first body portion 18 could be covered by another type of layer as long as the first body portion 18 is conductive. The layer could, for example, be painted, primed, anodized, or varnished.

Figure 4:
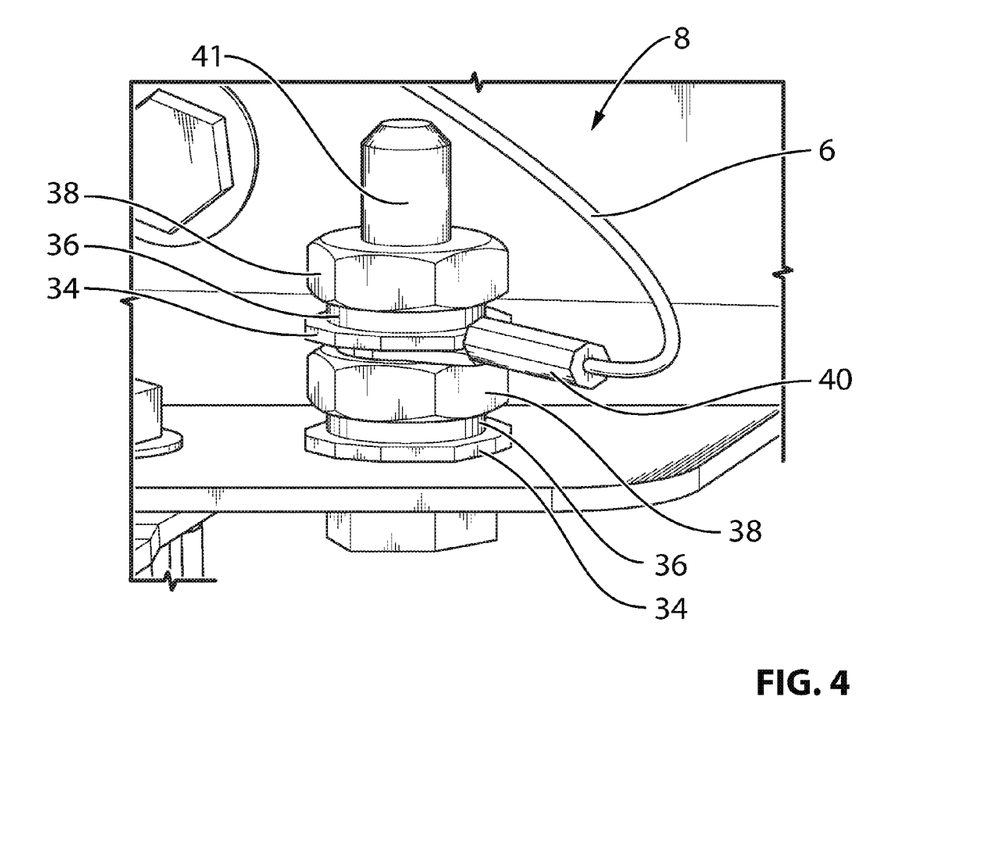
FIG. 4 is a close up view of a ground stud of the bracket of FIG. 1.

The third portion 22 includes the plurality of longitudinally spaced-apart ground studs 8 which allows connecting selected wires 6 of the wire bundle 5 to the ground. A close-up view of the ground studs 8 is shown in FIG. 4. The ground studs 8 are made of a stacking of washers 34, lock-washers 36, and nuts 38. Starting from the first face 14 and going away from the first face 14, each of the ground studs 8 includes: a washer 34 locally protecting the first face 14, a lock washer 36, a nut 38, another washer 34 locally protecting the lug 40, another lock washer 36, and another nut 38 which biases the washers 34, nut 36 and lug 40 toward the first face 14. A lug 40 of the electric wire 6 to be connected to the ground is disposed between one of the nut 38 and one of the washers 34. A screw 41 attaches the stacking to the third portion 22. The above is only one example of ground studs 8 for the bracket 10. The first face 14 of the third portion 22 in contact with the ground studs 8 is covered by a conductive layer such as the one of the first body portion 18 to enable ground once the bracket 10 is fixed to the structure. It is contemplated that the third portion 22 could be covered by another type of layer as long as the third portion 22 is conductive.

The bracket 10 may optionally attach a plurality of modules and components other than the wire bundles 5. In the particular embodiment shown in FIGS. 1 to 3, two terminal modules 42 are attachable to the third portion 22 of the bracket 10. Examples of terminal modules 42 include junction boxes, relays, or diode boards. It is contemplated that the terminal modules 42 could be attached elsewhere on the bracket 10. The bracket 10 allows attaching the terminal modules 42 to the wire harness assembly 7 with a reduced number of brackets and reducing a space occupied by the wire harness assembly 7. In addition, if desired and as shown in FIG. 1, the attachment to the bracket 10 allows connecting some of the electric wires 44 of the terminal modules 42 to the ground studs 8. The terminal modules 42 are attached to the bracket 10 by an intermediate bracket 46. The intermediate bracket 46 is fixed to the bracket 10 by screw and washer assemblies 48. It is contemplated that the intermediate bracket 46 could be attached to the bracket 10 by other ways, For example, the intermediate bracket 46 could have releasable connections to the bracket 10 such as the screw and washer assemblies 30 and the nut plates 31 described above. In another example, the intermediate bracket 46 could be riveted to the bracket 10. The intermediate bracket 46 can have various shapes. The intermediate bracket 46 usually has a shape compatible with a space available when attaching to the receiving structure.

The bracket 10 may have various designs. In the particular embodiment shown in FIGS. 1 to 3, a harness connection area or interface portion (i.e. rack 24) is on a same face (i.e. first face 14) as the ground studs 8. It is however contemplated that the harness connection area and the ground studs 8 could each be on a different face of the body 12 of the bracket 10. For instance, as shown in FIG. 5, the bracket 10' has the racks 24' on a first face 14' and a plurality of ground studs 8' on an opposite face 16' of the bracket 10'. The ground studs 8 could be also located in a same area of the bracket 10 or could be distributed throughout the bracket 10.

Figure 7:
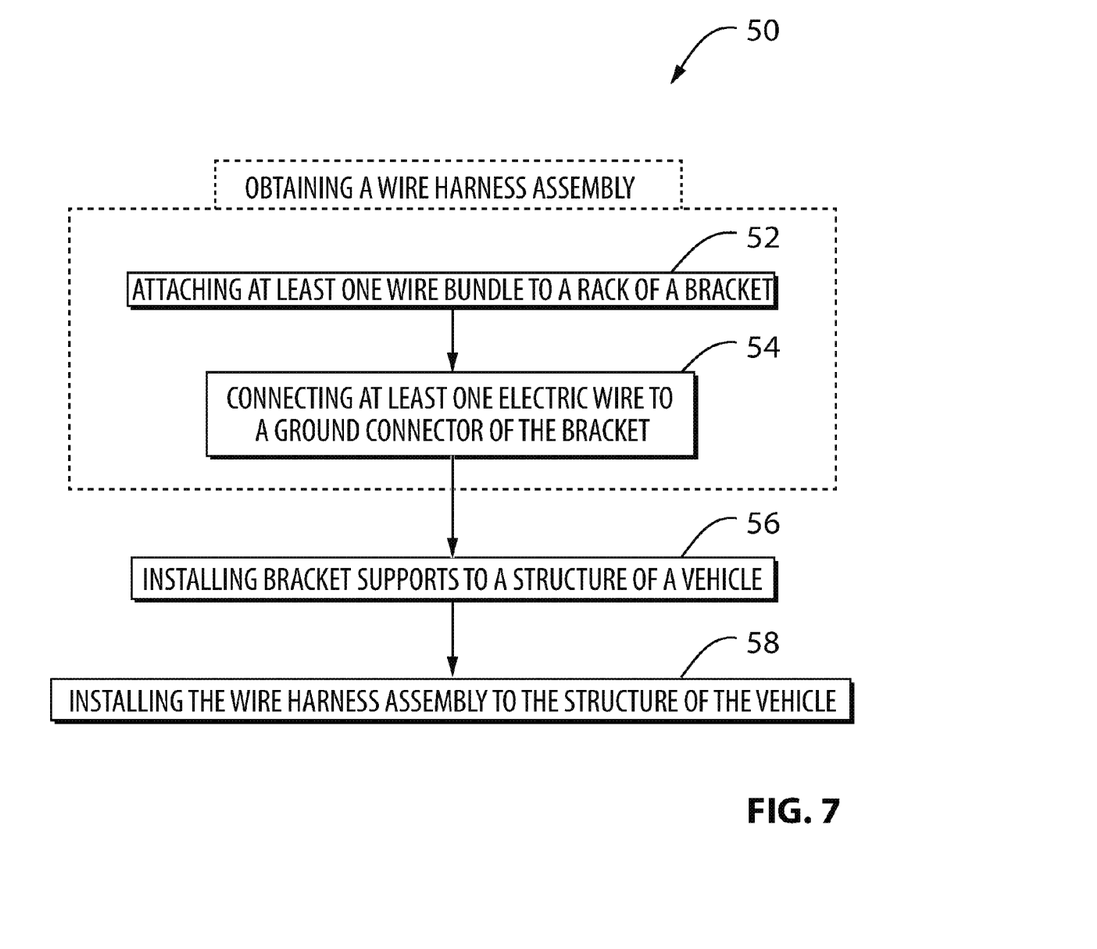
FIG. 7 is a flow chart of a method of forming a wire harness assembly using any one of the brackets of FIGS. 1 to 6.

Turning to FIG. 7, a method 50 of forming a wire harness assembly 7 using any of the various embodiments of the bracket 10 will be described. The wire harness assembly 7 is prepared before it is installed on the structure of the vehicle. In one non-limiting example, the vehicle is an aircraft and the structure is an aircraft metallic frame.

The method 50 starts at step 52 by attaching at least one of the wire bundles 5 to one or more of the brackets 10 in a manner as described above using for example tie-wraps on the rack 24. The wire bundles 5 and positions of the brackets 10 are chosen in accordance to a map. The map indicates, among other things, positions of the wire bundles 5, the brackets 10, the terminal modules 42 and the connections to the ground that all together form the wire harness assembly 7. The map allows constructing the wire harness assembly 7 as it would be when installed to the structure the vehicle except that it might be assembled outside of the structure and attached to the structure only after an assembly formed by wire bundles 5 attached to the rack 24 and grounded to the ground studs 8 of the body portion 20 of the bracket 10 is completed.

From step 52, the method goes to step 54, where those wires 6 of those wire bundles 5 that need to be connected to the ground (according to the map) are connected to the ground studs 8 of the same brackets 10 holding the wire bundles 5. All the wire bundles 5 may be first attached to the brackets 10 and the wires 6 connected the ground studs 8 thereafter, or the wires 6 may be connected to the ground studs 8 as the brackets 10 are attaching the wire bundles 5. In any of those two situations, step 52 is performed without the wire bundles 5, bracket 10 or wires 6 attached to the structure. The lugs 40 of those wires 6 that are connected to the ground studs 8 are inserted onto the screw 41 between one of the nuts 38 and one of the washers 34 of the ground studs 8.

As a result of attaching the wire bundles 5 to the brackets 10 and one or more wires 6 of the wire bundles 5 to the ground studs 8 of the brackets 10 (in any order desired), the wire harness assembly 7 is obtained. The wire harness assembly 7 is obtained remotely from the structure of the vehicle, i.e. it not attached to the structure of the vehicle or built onto the structure of the vehicle. Steps 52 and 54 may be performed in any order. Steps 52 and 54 are performed away from the structure of the vehicle to form a wire harness assembly 7 unattached from the structure. Although the wire harness assembly 7 could be formed in a location remote to that of the vehicle and shipped there for attachment thereto, the wire harness assembly 7 could also be assembled near by the vehicle and attached thereto once assembled. In any case, the wire harness assembly 7 including ground connections is first formed before it is attached to the structure of the vehicle.

From step 54, the method goes to step 56, where the bracket supports 32 are attached to the structure of the vehicle. Positions of the bracket supports 32 are determined by the map and correspond to attachment locations of the bracket 10 onto the structure. Step 56 may be performed at any time before or after any one of steps 52 and 54. The bracket supports 32 enable attachment of the brackets 10 to the structure of the vehicle so as to install the wire harness assembly 7 onto the vehicle. The bracket supports 32 may be riveted to the structure of vehicle when the wire harness assembly 7 is formed so as to engage with the brackets 10. The bracket supports 32 could also be riveted to the structure of the vehicle at the same time the wire harness assembly 7 is installed onto the structure of the vehicle. Pending of the environment in which the wire harness assembly 7 is installed, a sealing fillet, or another protective barrier such as SupercorrA or B against humidity ingress around or inside at a connection of the bracket 10 to the bracket support 32 may be required as long as the faying surfaces remain electrically conductive.

From step 56, the method goes to step 58, where the wire harness assembly 7 is installed to the structure of the vehicle. Each bracket 10 is connected to a corresponding bracket support 32 as indicated on the map 32 via the screw and washer assemblies 30 and the nut plates 31 described above. At the end of step 58, the wire harness assembly 7 is installed onto the structure of the vehicle.

As mentioned above, the bracket 10 could be used to attach things other than the wire bundles 5. Some of the brackets 10 could support the terminal modules 42. The terminal modules' 42 locations could be indicated on the map and the terminal modules 42 could be attached to the desired brackets 10 at the same time as the wire bundles 5 or the grounds are connected. When needed (i.e. depending on the map) some of the wires of the terminal modules 42 could be connected to the grounds studs 8 of the same bracket 10 the terminal modules 42 are attached to.

The above method does not involve assembling the wire harness as it is being attached onto the structure of the vehicle, but rather assembling at least partially the wire harness before it is being attached to the structure of the vehicle. As such, the above method enables different parties, which may or may not be physically located at different locations, to assemble the wire harness and attaching it to the vehicle. Assembling the wire harness and thereafter attaching it to the vehicle may reduce a time needed to form and install the wire harness into the vehicle. In addition, using the above described bracket which integrates ground connections may allow reducing a number of brackets needed which in turn may reduce a weight of the harness assembly. A variety of brackets needed may also be reduced which in turn eases installation. A number of holes on the structure of the vehicle and a number of operations to perform may also be reduced. Because the ground studs are located at proximity of the wire bundles, a length of the wire may be reduced.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A bracket for forming a wire harness assembly prior to installation to a structure of a vehicle, the bracket comprising:
   a conductive body adapted to attach the bracket to the vehicle;
   an interface portion adapted to attach a plurality of wire bundles of a wire harness to the body, the interface portion being conductively insulated from the body;
   at least one ground connector attached to the body, the at least one ground connector being adapted to electrically connect the wire harness to a ground;
   a module connection portion attached to the body, the module connection portion being attachable to a plurality of terminal modules other than the wire bundles; and
   a bracket support attached to the body, the bracket support being adapted to attach the body to the structure of the vehicle,
   wherein the conductive body, the interface portion, the at least one ground connector and the module connection portion are attachable to the structure of the vehicle through said bracket support.

2. The bracket as defined in claim 1, wherein the at least one ground connector includes at least one ground stud.

3. The bracket as defined in claim 2, wherein the at least one ground stud includes a screw inserted in a stacking of washers, lock-washers and nuts.

4. The bracket as defined in claim 1, wherein the interface portion includes at least one rack having a plurality of apertures configured to receive a tie connector therein.

5. The bracket as defined in claim 1, wherein the interface portion includes at least one clamp.

6. The bracket as defined in claim 1, wherein the interface portion is made of nylon.

7. The bracket as defined in claim 1, wherein the body is integrally formed.

8. The bracket as defined in claim 1, wherein the body includes a surface treatment preventing oxidation but allowing electric conduction.

9. The bracket as defined in claim 1, further comprising the plurality of terminal modules attached to the module connection portion.

10. The bracket as defined in claim 9, wherein the at least one module includes at least one wire connectable to the at least one ground connector.

11. The bracket as defined in claim 9, further comprising an intermediate bracket attaching the at least one module to the module connection portion.

12. The bracket as defined in claim 1, wherein the bracket support is removably attached to the body.

13. A method of forming a wire harness assembly for installation to a structure of a vehicle, the method comprising:
- a) attaching a plurality of wire bundles to a bracket, the bracket comprising a conductive body adapted to attach the bracket to the vehicle, an interface portion adapted to attach at least one wire of the wire harness assembly to the body, the interface portion being conductively insulated from the body, a module connection portion attachable to a plurality of terminal modules other than the wire bundles, and a bracket support attached to the body, the bracket support being adapted to attach the body to the structure of the vehicle;
- b) connecting at least one of a plurality of electric wires of the wire bundles to at least one ground connector of the bracket;
- c) attaching the plurality of terminal modules to the module connection portion;
- wherein steps a), b) and c) are performed outside of the structure of the vehicle, and wherein the conductive body, the interface portion, the at least one ground connector and the module connection portion are attachable to the structure of the vehicle through said bracket support.

14. The method as defined in claim 13, wherein steps a) and b) result in obtaining a wire harness assembly for attachment to the structure of the vehicle.

15. The method as defined in claim 13, further comprising, once the wire harness assembly is formed, installing the wire harness assembly to the structure of the vehicle.

16. The method as defined in claim 15, wherein installing the wire harness assembly to the structure of the vehicle comprises attaching the wire harness assembly to the structure of the vehicle.

17. The method as defined in claim 15, wherein the bracket support is removably attached to the conductive body and wherein attaching the wire harness assembly to the structure of the vehicle comprises attaching the conductive body to the corresponding bracket support connected to the structure of the vehicle.

18. The method as defined in claim 17, wherein attaching the harness assembly to the bracket support provides electric connection between the wire harness assembly and the structure of the vehicle.

19. The method as defined in claim 13, further comprising connecting at least one terminal module to the bracket when performing either one of steps a) and b).

20. The method as defined in claim 13, wherein the terminal modules comprise any one of a junction box, a relay and a diode board.

* * * * *